United States Patent [19]

Ammann

[11] Patent Number: 5,347,136

[45] Date of Patent: Sep. 13, 1994

[54] CONDUIT CONSTRUCTION LASER SYSTEM AND LASER BEAM RECEIVER

[75] Inventor: Hans-Rudolf Ammann, Amriswil, Switzerland

[73] Assignee: Ammann Lasertechnik AG, Amriswil, Switzerland

[21] Appl. No.: 974,179

[22] Filed: Nov. 10, 1992

[30] Foreign Application Priority Data

Nov. 25, 1991 [CH] Switzerland .................. 03440/91

[51] Int. Cl.[5] ............................................ H01J 40/14
[52] U.S. Cl. ............................... 250/206.3; 356/400
[58] Field of Search ................. 250/561, 206.2, 206.3; 356/399, 400, 149; 33/290; 385/88, 90, 91

[56] References Cited

U.S. PATENT DOCUMENTS

| | | | |
|---|---|---|---|
| 4,062,634 | 12/1977 | Rando et al. | 356/248 |
| 4,904,081 | 2/1990 | Miyahara | 356/400 |
| 4,904,086 | 2/1990 | Cope | 356/400 |
| 4,907,881 | 3/1990 | Jones | 356/400 |

*Primary Examiner*—David C. Nelms
*Attorney, Agent, or Firm*—Nies, Kurz, Bergert & Tamburro

[57] ABSTRACT

A conduit construction laser system comprises a light source producing the laser beam which is pivotally mounted in its front region emitting the laser beam in its longitudinal and transverse axes. The rear region of this light source is articulated to an adjusting device which is horizontally displaceable transversely to the axis of the light source for lateral alignment of the laser beam. The adjusting device has a vertical spindle on which the rear end of the light source is mounted upwardly and downwardly movably so that the laser beam can be levelled. Owing to a second spindle, the inclination of the laser beam can be adjusted on the basis of the levelling. A laser beam receiver has photocells which are arranged in the form of a target cross on the side facing the laser beam and are connected to similarly arranged light-emitting diodes on the side remote-from the laser beam. The corresponding light-emitting diode lights up when the laser beam impinges on a photocell. Owing to its compact design, the conduit construction laser system may be used for the construction of small diameter pipelines. Measuring work may be carried out up to a distance of 300 m together with the receiver.

15 Claims, 4 Drawing Sheets

CONDUIT CONSTRUCTION LASER SYSTEM AND LASER BEAM RECEIVER

FIELD OF THE INVENTION

This invention relates to a conduit construction laser system with automatic levelling of the longitudinal axis and with means for adjusting the inclination and the lateral alignment of the laser beam and to a laser beam receiver for such a conduit construction laser system.

BACKGROUND OF THE INVENTION

Laser beam levelling devices serve to establish a horizontal or inclined plane and are used for building purposes. The laser beam issuing from the device is received a certain distance away by a receiver. The inclination of the imaginary plane between the laser beam system and the receiver may therefore be measured. Laser beam levelling devices are used, for example, in excavation and the grading of pits, in the control of concrete foundations and concrete floors, alignment of shuttering, in the levelling of track members for construction cranes and in many other applications.

Conduit construction laser systems are a subgenus of laser beam levelling devices. They are used in the construction of pipelines, for example drainage lines, to lay the individual lengths of pipe in the desired inclination and direction. The lengths of pipe are lined up until they form a pipeline with an inclination of, for example, 1.2%. Shafts are installed at intervals of 50 to 70 m. There is no change of direction between the shafts. The inclination of the individual portions of pipeline between the shafts must be selected so as to differ in each case in practice.

During the construction of a pipeline, the conduit construction laser system is erected at the beginning of a line, i.e. normally in the region of a shaft, such that the laser beam points in the desired direction and has the desired inclination. The laser beam therefore indicates both the direction and the inclination in which the pipeline is to be constructed. A receiver is inserted at the opposite end of the length of pipe to be positioned. The receiver has a transparent plate with markings in the form of a reticle. The laser beam issuing from the conduit construction laser system impinges on the plate of the receiver as a light spot. As soon as this light spot is located in the centre of the reticle, the length of pipe is correctly positioned and may be fastened in this position.

Helium-neon laser tubes producing a laser beam which is visible to a maximum distance of 100 m, depending on the optical system concentrating the laser beam, are installed in formerly known conduit construction laser systems. The light spot is consequently greater at the receiver and is no longer visible. For reasons of cost, pipeline manufacturers increasingly wish to increase the intervals between the individual shafts, for example by omitting every second shaft. The resultant shaft intervals of up to 140 m cannot however be accomplished with former conduit construction laser systems.

So-called laser diodes have also become available recently. These have the advantage that they consume far less power than conventional helium-neon laser tubes. The former conduit construction laser systems are allocated to an external power source owing to the high energy consumption of the laser tubes. Furthermore, laser diodes are considerably smaller in their dimensions so the overall size of the laser systems could be smaller, making them suitable for the construction of smaller diameter pipelines. The former conduit construction laser systems are suitable for pipelines having diameters of at least 150 mm. The drawback is that the laser beam from the formerly offered laser diodes is visible only up to 40 or at most 50 m.

SUMMARY OF THE INVENTION

The object of the present invention is to provide a conduit construction laser system which is particularly compact in its external dimensions but which is relatively simple in construction and which also operates with high precision. The invention also aims to provide a laser beam receiver with which the laser beam may be received at a greater distance than was formerly possible with conduit construction laser systems.

According to one aspect of the invention, there is provided a conduit construction laser system having automatic levelling of the longitudinal axis and means for adjusting the inclination and the lateral alignment of the laser beam, said system comprising a light source for producing the laser beam which is pivotally mounted in its front region emitting the laser beam, in its longitudinal axis and in its transverse axis; and an adjusting device articulated to the rear region of the light source, said adjusting device having means for adjusting the horizontal displacement of the rear end of the light source so that the light source is pivotal round a vertical axis for the lateral alignment of the laser beam and further means for adjusting the vertical displacement of the rear end of the light source so that the light source is pivotal round a horizontal axis for levelling the laser beam.

The particular advantage of this design of conduit construction laser system is that the automatic levelling of the longitudinal axis and the lateral alignment of the laser beam are carried out by means of a single basic adjusting device to which there is articulated the rear end of the light source which is pivotally mounted in its front region and produces the laser beam. With the former conduit construction laser systems, two separate adjusting devices arranged inside one another were required for the levelling and lateral alignment of the laser beam.

Owing to the compact design, the conduit construction laser system according to the invention may also be used for the construction of pipelines having a smaller diameter than that possible hitherto. This is the case, in particular, if the system is designed for a laser diode rather than a conventional laser tube. The system may then be inserted in pipelines having diameters, for example, of only 120 mm. Owing to the compact mechanical system, the system according to the invention is not only narrower but also shorter, allowing space for a battery part so that the system can operate independently of an external energy source.

Another aspect of the present invention provides a laser beam receiver for receiving the laser beam emitted by the conduit construction laser system according to the invention, the receiver comprising a target field having means for determining the position of the light spot formed by the laser beam on this target field and means for displaying the position of the laser beam light spot on the target field, said target field being arranged on a side of the receiver facing the laser beam and said display means being arranged on a side of the receiver remote from the laser beam.

Owing to the laser beam receiver according to the invention, the laser beam may be received and made visible at a distance of up to 300 m, depending on the laser tube or laser diode used.

BRIEF DESCRIPTION OF THE DRAWINGS

The invention will now be described in more detail, by way of example, with reference to the drawings, in which.

DESCRIPTION OF PREFERRED EMBODIMENTS

Figure 1:
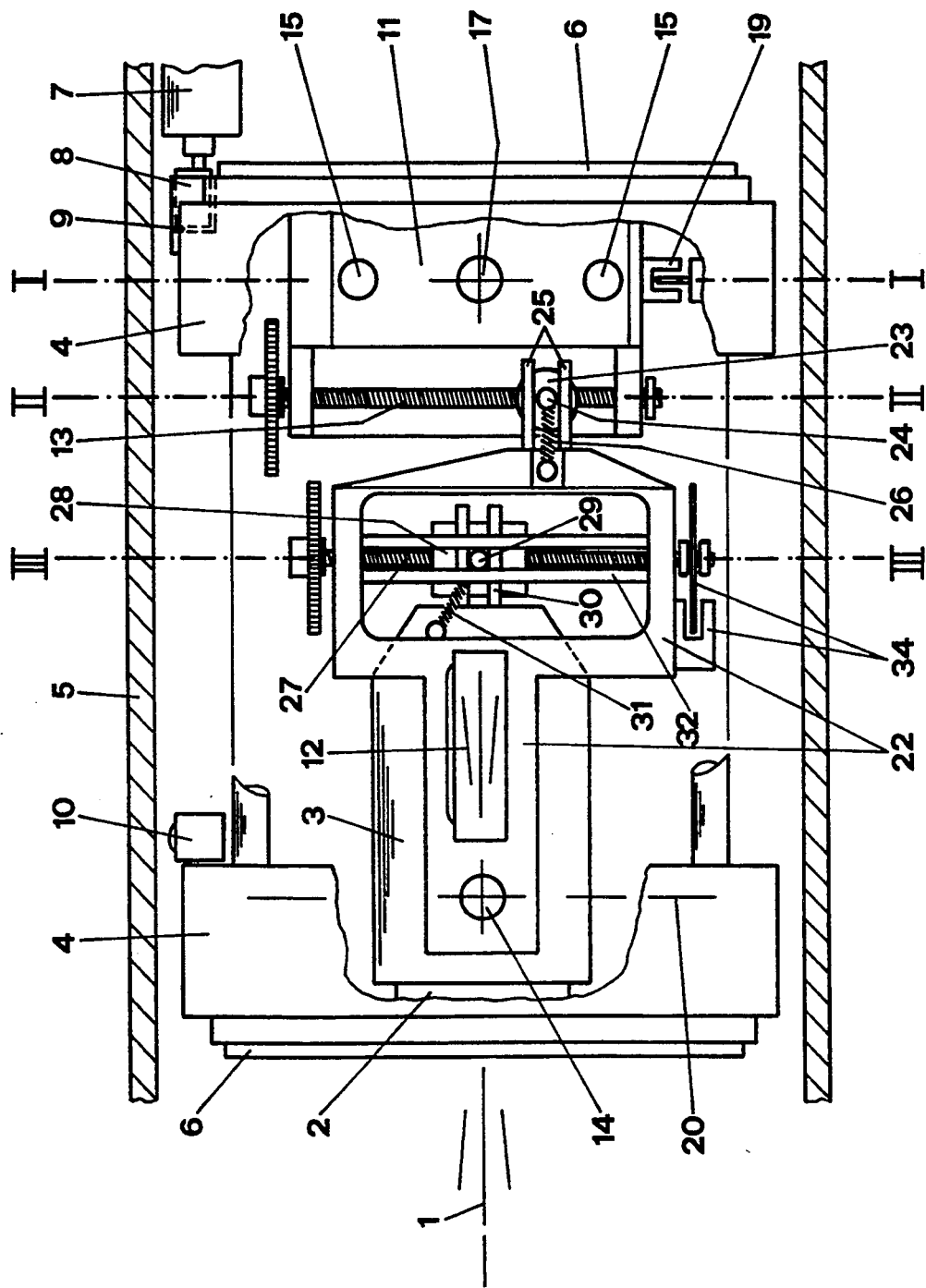
FIG. 1 is a schematic longitudinal section through one embodiment of a conduit construction laser system according to the invention.

Referring to the drawings, the conduit construction laser system according to the invention has automatic levelling of the longitudinal axis and also automatic levelling of the transverse axis. The laser beam issuing from the system is adjustable in two axes. It is possible to adjust both the inclination, i.e. the angle of elevation, and the lateral alignment, i.e. the azimuth angle. The desired adjustment is made by means of an electronic controller on a keypad arranged on the system casing.

FIG. 1 shows the mechanical make-up of the conduit construction laser system. The laser beam 1 is produced by a light source, a laser diode 2 in this case, arranged in a casing 3. The mechanical system as well as a portion of the electronic system (not shown) are held in a frame 4 with cylindrically hollowed ends, the frame 4 in turn being arranged in a cylindrical system casing 5. The frame 4 is rotatably mounted at both ends on face-end and intermediate walls of the system casing 5 by means of ball bearings 6 in a manner not illustrated here.

Automatic levelling of the conduit construction laser system in its transverse axis is carried out by means of an eccentric shaft 8 which is driven by an electric motor 7 and engages in a recess 9 on the frame 4. This is carried out by means of an electronic controller in conjunction with a transversely arranged electrolytic level 10. The frame 4 is therefore rotatable in a range which is restricted but is adequate for the present purpose.

Automatic levelling of the longitudinal axis is carried out by means of a basic adjusting device 11 together with a second, longitudinally arranged electrolytic level 12. The laser diode 2 located in its casing 3 is pivoted indirectly round a horizontal axis 14 by means of a spindle 13.

Figure 2:
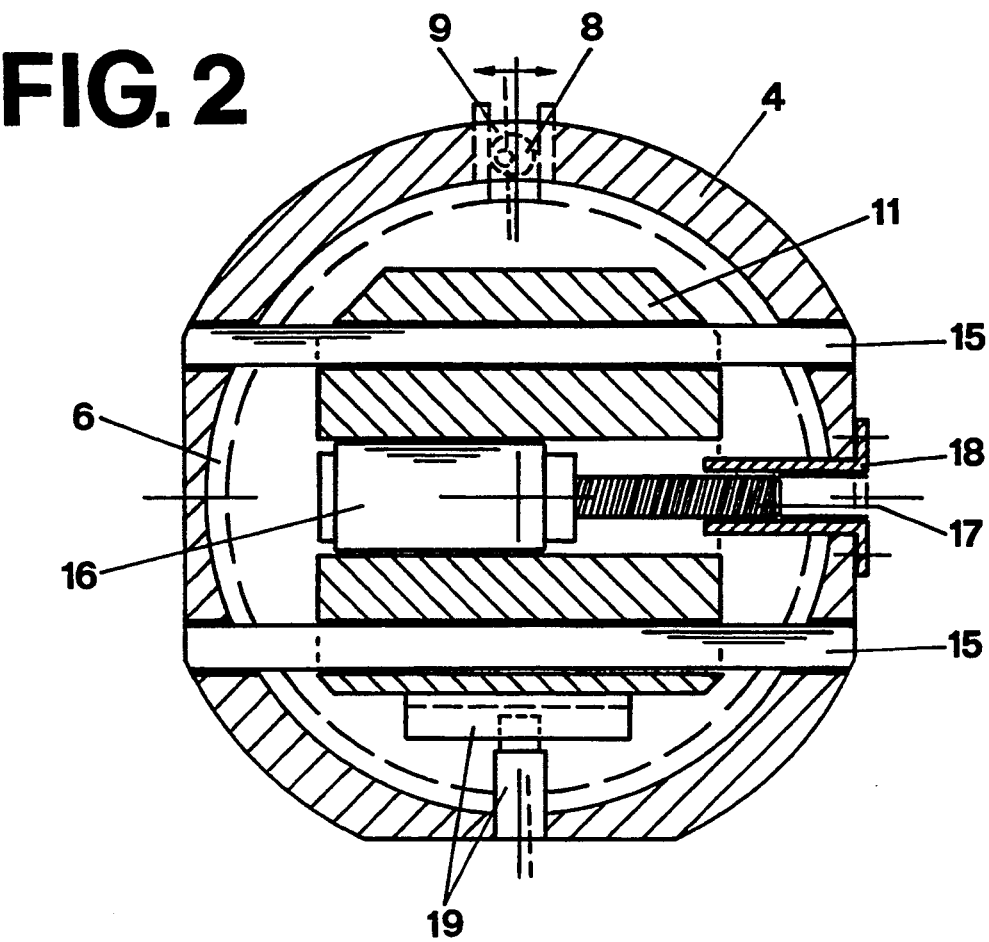
FIG. 2 is a section taken along the line I—I in FIG. 1.

The basic adjusting device 11 serves not only for automatic levelling of the longitudinal axis. It also performs lateral alignment, i.e. the adjustment of the azimuth angle. For this purpose, the basic adjusting device 11 is movably arranged on two guides 15 fastened transversely to the longitudinal axis of the system on the frame 4, as shown in particular in FIG. 2. The basic adjusting device 11 is moved along the guides by means of an electric motor 16 which rotates a spindle 17. The spindle 17 engages in a threaded bush 18 on the frame 4 so that it either draws the basic adjusting device 11 toward the threaded bush 18 or pushes it away from it, depending on the direction of rotation. The position of the basic adjusting device 11 is monitored by an electric length measuring device 19 connected to the electronic controller. The laser diode 2 in its casing 3 is pivoted round a vertical axis 20 in the region of the horizontal axis 14 by the lateral displacement of the basic adjusting device 11. The casing 3 is therefore mounted by a universal joint.

Figure 3:
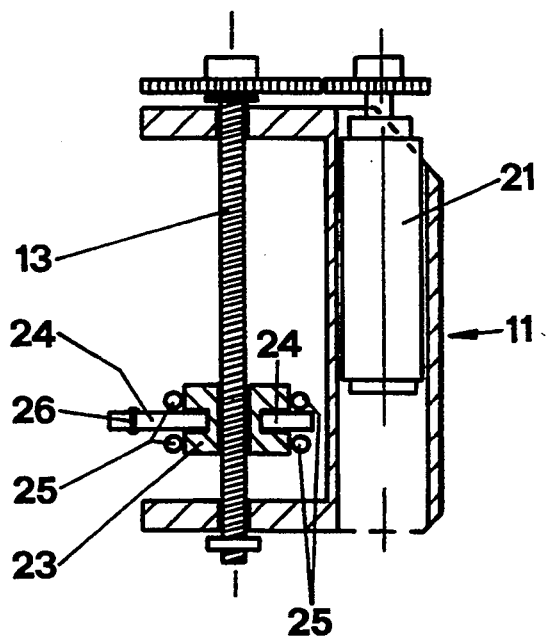
FIG. 3 is a section taken along the line II—II in FIG. 1.

FIGS. 1 and 3 show clearly the portion of the basic adjusting device with the spindle 13 required for automatic levelling of the longitudinal axis. The spindle 13 is driven by an electric motor 21. The rear end of a mounting 22 which receives the casing 3 of the laser diode 2 is articulated to the spindle 13. Both the casing 3 and the mounting 22 are pivotal round the axis 14 in their front region. The mounting 22 and the spindle 13 are connected by a nut 23 from both sides of which there projects a respective pin 24 standing horizontally, transversely to the mounting 22. At its rear end facing the nut 23, the mounting 22 has a fork 25. This fork 25 has four prongs which are arranged such that two respective tongs come to rest on one side of the nut 23 and closely surround the pin 24 there. A tension spring 26 fixed between the rear end of the mounting 22 and the pin 24 ensures that the nut 23 is easily tilted in the fork 25 and is therefore guided without play in this fork 25. When the spindle 13 is rotated by the electric motor 21, the nut 23 moves upwardly or downwardly depending on the direction of rotation of the spindle 13. The rear end of the mounting 22 co-operating with the nut 23 via the fork 25 is also moved upwardly or downwardly. The mounting 22 is therefore pivoted round the axis 14 so that the laser beam is inclined either upwardly or downwardly. Since both the electric motor 21 and the level 12 are connected to the electronic controller, the laser beam is automatically levelled.

Figure 4:
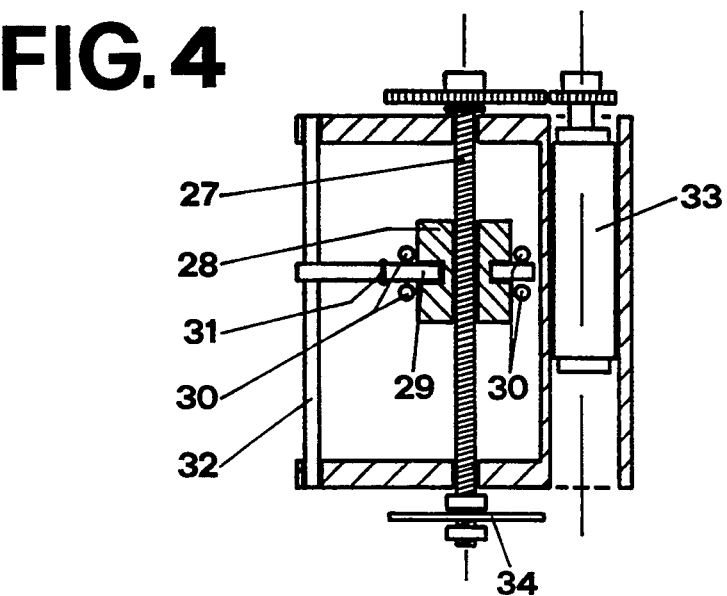
FIG. 4 is a section taken along the line III—III in FIG. 1.

FIGS. 1 and 4 show how the desired inclination of the laser beam is achieved, on the basis of levelling. This is effected in that the casing 3 receiving the laser diode 2 is also pivotally mounted round the axis 14 within the mounting 22. The upward and downward movement of the rear end of the casing 3 takes place as with the mounting 22. A spindle 27, a nut 28 with lateral pins 29 and a four-pronged fork 30 are also provided here. Two respective prongs of this fork 30 surround the pin 29 on one side of the nut 28. Unnecessary play of the nut 28 is avoided by a tension spring 31 fixed between the pin 29 on one side of the nut 28 and the rear end of the casing 3. As the nut 28, in contrast to the nut 23, is designed as a vertically standing cylinder and would therefore rotate, a rod 32 acts as a stop for the pin 29. The tension spring 31 is thus prevented from rotating the nut 28 beyond the desired extent. The spindle 27 is rotated by an electric motor 33. To enable the rotation of the spindle 27 and therefore the inclination of the laser beam to be measured, a photoelectric rotation measuring device 34 is arranged at the lower end of the spindle 27 and, like the electric motor 33, is connected to the electronic controller. As already mentioned, the desired inclination may be adjusted at a keypad arranged on the system casing.

Figure 5:
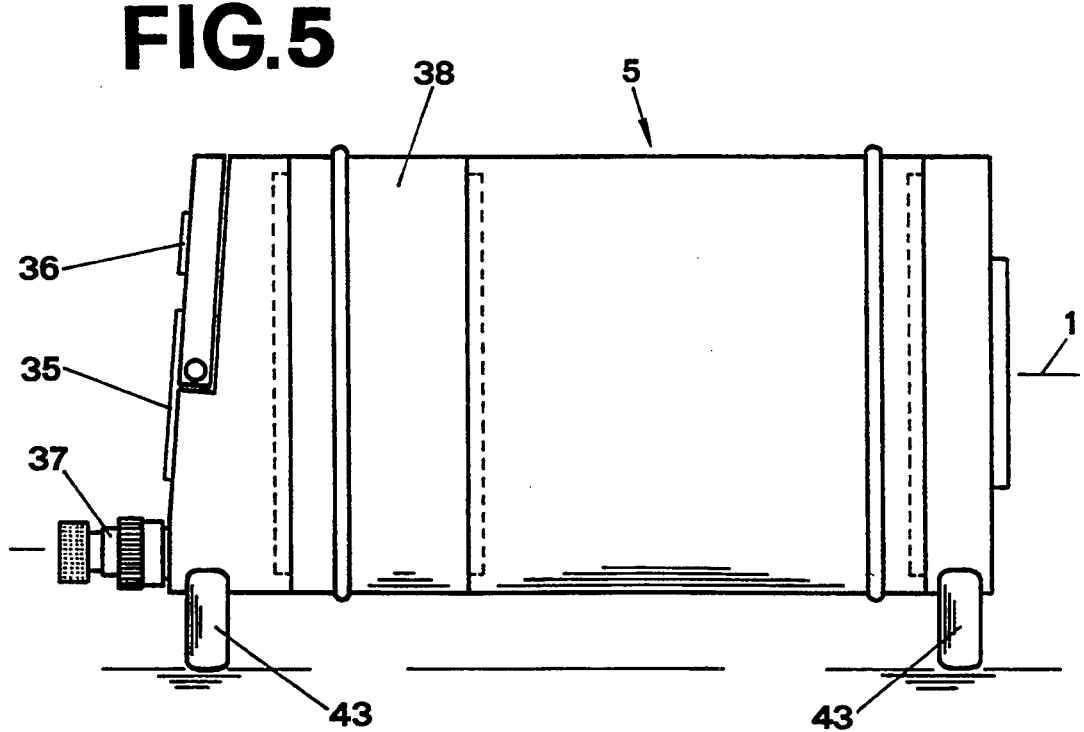
FIG. 5 is an external view of the device shown in FIG. 1.

FIG. 5 shows the system casing 5 from one end face of which the laser beam 1 issues. A keypad 35 with a display 36 is arranged on the opposite end face. A plug connection 37 for a possible external power source and/or a remote controller is also located here. The batteries are located in a removable casing part 38. The user can operate the system with batteries or can unscrew the casing part 38 and screw the rear casing part comprising the keypad 35 directly onto the foremost casing part containing the laser diode, as desired. In this shortened form, the system is only half as long as formerly known conduit construction laser systems.

The system casing 5 overall as well as the individual parts of the system are watertight so moisture-induced disturbances cannot occur.

Figure 6:
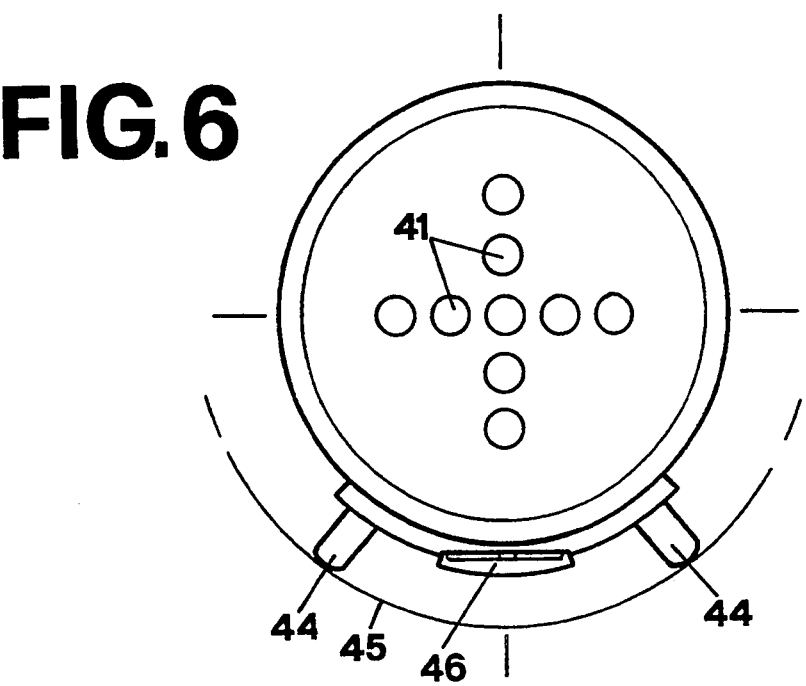
FIGS. 6, 7 and 8 are schematic views of a laser beam receiver.
Figure 7:
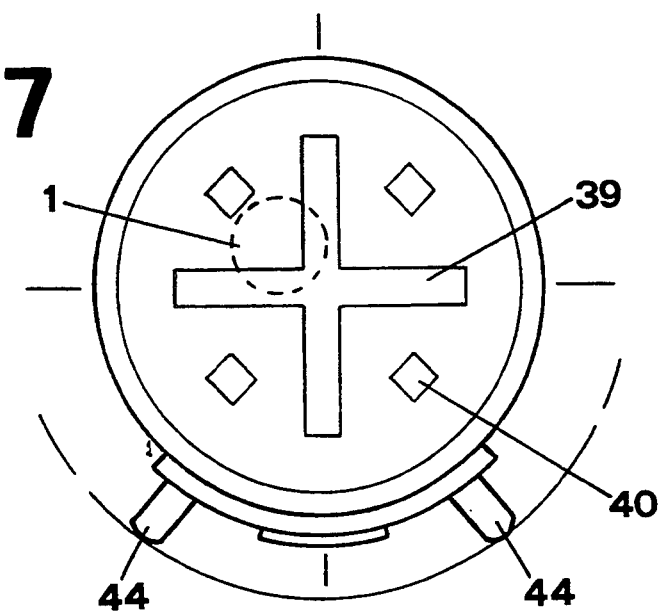
Figure 8:
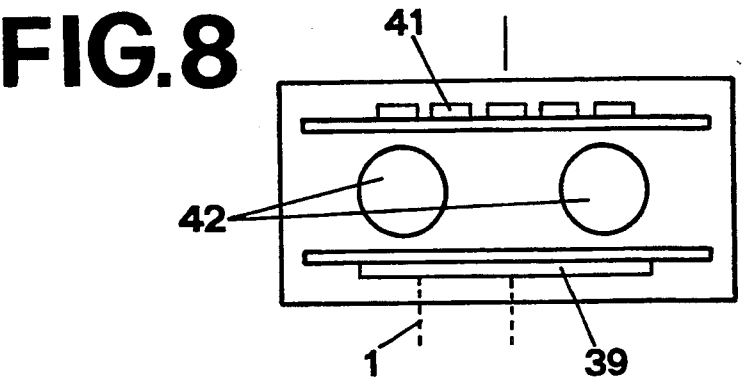

The laser beam receiver will now be described with reference to FIGS. 6 to 8. FIG. 6 shows the side of the receiver remote from the laser beam coming from the conduit construction laser system and FIG. 7 shows the side of the receiver facing the laser beam. FIG. 8 shows a plan view of the receiver.

On the side which is to face the laser beam 1 (FIG. 7), the receiver has photocells 39 which are arranged in the form of a cross in this case. Further photocells 40 which cover the free space between the crosspiece of the cross may additionally be provided. However, the photocells could also be arranged in concentric rings. These photocells 39 and 40 are opposed, on the opposite side of the receiver (FIG. 6), by light-emitting diodes 41 also arranged in the form of a cross. The photocells 39 and 40 on the one hand and the light-emitting diodes 41 on the other hand are electrically connected to one another. The power is supplied by batteries 42 arranged between the carrier elements of the photocells and light-emitting diodes in the cylindrical casing of the receiver.

Both the conduit construction laser system and the laser beam receiver stand on feet 43 and 44. The mass of the cylindrical casing of the two systems and their feet 43 and 44 are advantageously adapted to one another such that, with the correct alignment, the laser beam issuing in the centre of the end face of the conduit construction laser system impinges exactly in the centre of the photocell cross of the receiver. As a positioned aid in the pipe 45, both systems comprise a level 46.

As the conduit construction laser system according to the invention is particularly precisely adjustable despite its compact design, the laser beam 1 will impinge upon the circular field of the receiver even from a great distance. As the laser beam 1 impinges as a light spot with a diameter of approximately 20 to 25 mm from a distance of, for example, 100 m, the photocells 39 and 40 are sufficient to receive it and to recognise its position on the target face of the receiver. The corresponding light-emitting diodes 41 light up according to the photocells 39 arranged in the form of a cross and/or the additional photocells 40 on which the laser beam 1 impinges. The pipe 45 then merely needs to be aligned such that only the light-emitting diode in the centre of the cross lights up. The pipe 45 is then exactly positioned and can be fastened in this position.

To enable the photocells 39 and 40 to perceive the laser beam 1 even when the receiver is erected at a great distance from the conduit construction laser system, the conduit construction laser system is advantageously designed such that the laser beam 1 is emitted not in an uninterrupted manner but in a pulsed manner. Since the laser beam light spot is switched on and off continuously, the photocells 39 and 40 are capable of recording the difference in brightness between the laser beam light spot and daylight from a distance greater than with a laser beam emitted uninterruptedly.

I claim:

1. A conduit construction laser system having automatic levelling of the longitudinal axis and means for adjusting the inclination and the lateral alignment of the laser beam, said system comprising a light source for producing the laser beam, wherein the light source has a front end and a rear end and is mounted for pivotal movement about mutually perpendicular pivot axes that intersect adjacent the front end from which the laser beam is emitted, and wherein the light source is pivotable about its longitudinal axis and about a transverse axis; and an adjusting device articulated to the rear end of the light source, said adjusting device having means for adjusting the horizontal displacement of the rear end of the light source so that the light source is pivotable about a vertical axis for the lateral alignment of the laser beam, and further means for adjusting the vertical displacement of the rear end of the light source so that the light source is pivotable about a horizontal axis for levelling the laser beam.

2. A conduit construction laser system as claimed in claim 1, in which, for horizontal displacement of the rear end of the light source, the adjusting device is laterally displaceably mounted along at least one guide, an electric motor being provided for displacing the adjusting device along said guide and means being provided for monitoring the displacement position of the said rear end of the light source.

3. A conduit construction laser system as claimed in claim 1, in which said further means for adjusting the vertical displacement of the rear end of the light source comprise a spindle with a component guided thereon with an internal screw-thread to which component the rear end of the light source is articulated.

4. A conduit construction laser system as claimed in claim 3, in which the rear end of the light source is provided with a mounting having a fork which is non-positively guided by the threaded component on the spindle for guiding the light source.

5. A conduit construction laser system as claimed in claim 4, in which the threaded component has, on two mutually opposed sides, a respective pin which stands transversely to the system axis and projects from said component and in which the fork has four prongs which are arranged such that two respective prongs engage with a respective pin on each of said opposed sides of said threaded component.

6. A conduit construction laser system as claimed in claim 5, in which a spring is fixed between the rear end of the mounting and the pin on one side of the threaded component ensuring that the component is guided in the fork without play.

7. A conduit construction laser system as claimed in claim 3, in which, for inclination of the laser beam, the light source is pivotally mounted round a horizontal axis within a mounting.

8. A conduit construction laser system as claimed in claim 7, in which the mounting has a spindle with a component guided thereon with an internal thread, to which component the rear end of the light source is articulated for vertical displacement of the rear end of the light source and in which means are provided to enable the rotational position of the spindle and therefore the inclination of the laser beam to be measured.

9. A conduit construction laser system as claimed in claim 8, in which the laser beam light source is housed in a casing and in which a fork is arranged at the rear end of the casing, said fork being non-positively guided by said threaded component on said spindle.

10. A conduit construction laser system as claimed in claim 9, in which the threaded component has, on two mutually opposed sides, a respective pin standing transversely to the system axis and projecting from the component, and in which the fork has four prongs which are arranged such that two respective prongs engage with a respective pin on each of said two opposed sides of said threaded component.

11. A conduit construction laser system as claimed in claim 10, in which a spring is fixed between the rear end of the casing and the pin on one side of the threaded component ensuring that the component is guided in the fork without play.

12. A conduit construction laser system as claimed in claim 1, in which means are provided to cause the laser beam to be emitted in a pulsed manner.

13. A laser beam receiver for receiving the laser beam emitted from the conduit construction laser system claimed in claim 1, said receiver comprising a target field having means for determining the position of the light spot formed by the laser beam on this target field and means for displaying the position of the laser beam light spot on the target field, said target field being arranged on a side of the receiver facing the laser beam and said display means being arranged on a side of the receiver remote from the laser beam.

14. A laser beam receiver as claimed in claim 13, in which the target field has photocells which are arranged in the form of a target cross or in concentric rings.

15. A laser beam receiver as claimed in claim 14, in which the display means comprise light-emitting diodes which are arranged to correspond to said photocells, are connected thereto and are arranged to light up when the laser beam light spot impinges on the associated photocell.

* * * * *